Patented Aug. 2, 1949

2,478,047

UNITED STATES PATENT OFFICE 2,478,047

ALPHA-AMINO-BETA,BETA - DIETHOXY-PROPIONIC ACID AND PROCESS FOR PREPARATION

Oscar H. Johnson, Medina, N. Y., assignor to Merck & Co., Inc., Rahway, N. J., a corporation of New Jersey No Drawing. Application February 14, 1947, Serial No. 728,724

5 Claims. (Cl. 260—534)

This invention is concerned generally with novel chemical compounds, and with processes for preparing the same; more particularly it relates to $\alpha$-amino-$\beta,\beta$-diethoxy-propionic acid, an important intermediate in the synthesis of penicillin, and with intermediate products and processes employed in synthesizing the same from readily available starting materials. The $\alpha$-amino-$\beta,\beta$-diethoxy-propionic acid is easily converted to $\alpha$ - phenylacetamido - $\beta,\beta$ - diethoxy - propionic acid, which, upon hydrolysis yields $\alpha$-formyl-phenaceturic acid. This compound and the esters thereof, are of value in the preparation of other organic compounds, some of which have anti-bacterial properties. These compounds may be converted into serine, an amino acid, by reduction with aluminum amalgam and hydrolysis with an acid. They may be condensed with cysteine to yield $\alpha$-[2-(4-carboxy)thiazolidinyl] phenaceturic esters, and with related compounds to yield similar reaction products. Other uses of these compounds will occur to those skilled in the art.

It is now discovered that $\alpha$-amino-$\beta,\beta$-diethoxy-propionic acid can be synthesized by reactions indicated as follows:

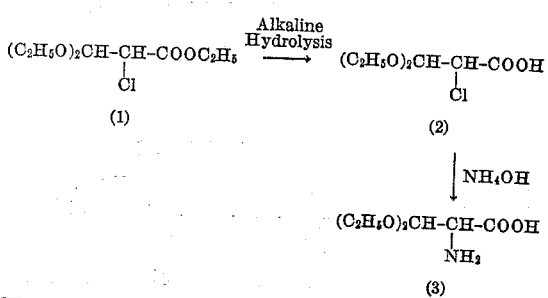

The reactions indicated above are conducted as follows: ethyl $\alpha$-chloro-$\beta,\beta$-diethoxy-propionate (1), which can be prepared as described in a co-pending application belonging to applicant's assignee, Serial No. 683,143, filed July 12, 1946, U. S. Patent 2,459,059, is subjected to alkaline hydrolysis to form $\alpha$-chloro-$\beta,\beta$-diethoxy-propionic acid (2); this compound is then reacted with aqueous ammonium hydroxide to produce $\alpha$-amino-$\beta,\beta$-diethoxy-propionic acid.

$\alpha$-Amino-$\beta,\beta$-diethoxy-propionic acid (3) can be converted to $\alpha$-phenylacetamido-$\beta,\beta$-diethoxy-propionic acid, by reaction with phenyl acetyl chloride. When the $\alpha$-phenylacetamido-$\beta,\beta$-diethoxy-propionic acid is heated with acetic anhydride the product obtained is 2-benzyl-4-ethoxymethylene-5(4)-oxazolone, which can be reacted with d-penicillamine to produce penicillin G.

Details for carrying out the procedures indicated above are disclosed in copending applications Serial No. 710,945, filed November 19, 1946, Serial No. 636,516, filed December 21, 1945, and Serial No. 656,772, filed March 23, 1946.

In carrying out my novel and improved process, ethyl $\alpha$-chloro-$\beta,\beta$-diethoxy-propionate is saponified by reaction with an aqueous solution of an alkaline hydrolyzing agent. When alkaline hydrolyzing agents, such as alkali metal hydroxides, as for example, sodium hydroxide or potassium hydroxide, or an alkaline earth hydroxide, such as barium hydroxide, and the like, are used, the ester grouping is saponified without affecting the acetal linkages. It is preferred to employ a temperature below about 50° C. in the saponification reaction. Unsaponified matter is extracted from the aqueous alkaline reaction solution by means of a water-immiscible solvent, such as ether. The aqueous solution is then acidified with a mineral acid, such as hydrochloric acid, sulfuric acid, and the like, and the $\alpha$-chloro-$\beta,\beta$-diethoxy-propionic acid thus formed is extracted from the aqueous solution by means of a water-immiscible organic solvent, such as ether. The non-aqueous extract is then dried and the solvent evaporated therefrom to produce crude $\alpha$-chloro-$\beta,\beta$-diethoxy-propionic acid.

The crude $\alpha$-chloro-$\beta,\beta$-diethoxy-propionic acid is reacted without further purification, at elevated temperature under pressure, with concentrated aqueous ammonium hydroxide. The time required for complete reaction is a function of the temperature. It is ordinarily preferred to employ a temperature of about 100° C. in the reaction, at which temperature the reaction is substantially complete in about 15 hours. However, the reaction may be carried out at temperatures as low as about 80° C., by employing a long reaction time. It is likewise possible to employ higher reaction temperatures up to about 150° C., if desired. The reaction solution is evaporated to dryness under reduced pressure and the residual material is extracted with a hot absolute alcohol solvent such as ethanol, methanol, and the like, which dissolves the $\alpha$-amino-$\beta,\beta$-diethoxy-propionic acid product, whereas the greater part of the ammonium chloride formed during the ammonolysis remains undissolved. The alcoholic solution may be decolorized, if desired, by treatment with an activated charcoal, such as Norit, which is removed by filtration and the decolorized alcoholic solution evaporated to dryness. The residual material which is substantially free of ammonium chloride is further purified by re-extraction with hot absolute alcohol, the alcoholic solution is filtered, and the filtrate is cooled, whereupon $\alpha$-amino-$\beta,\beta$-diethoxy-propionic acid crystallizes therefrom as a white crystalline granular powder. This material can be further purified, if desired, by recrystallization from aqueous alcohol but the purified product does not show a constant melting point.

The following examples illustrate methods of carrying out the present invention, but it is to

Example 1

About thirty-six grams (0.16 moles) of ethyl α-chloro-β,β-diethoxy-propionate are stirred at a temperature of about 25° C. with about 400 cc. of 0.5 N aqueous sodium hydroxide solution until substantially all of the ester dissolves, which requires a time of approximately ten to fifteen minutes. The aqueous alkaline solution is extracted once with ether, and the aqueous layer is cooled to about 5° C. and slowly acidified by the addition thereto of approximately 100 cc. of 2N aqueous sulfuric acid. The aqueous acid solution is then extracted with five 150 cc. portions of ether and the ether extracts are combined and washed twice with 25 cc. portions of water and then dried over anhydrous sodium sulfate. The dry ether extract is evaporated under reduced pressure and the residual material is dried in vacuo over phosphorus pentoxide to produce approximately 25 gms. of α-chloro-β,β-diethoxy-propionic acid; yield approximately 85% of theory.

Example 2

A mixture containing about 300 cc. of concentrated aqueous ammonium hydroxide (29% NH₃) and about fifteen grams of α-chloro-β,β-diethoxy-propionic acid, prepared substantially as described in Example 1, is heated at a temperature of about 100° C. for approximately fifteen hours in a closed vessel under pressure. The solvent is evaporated from the dark reaction solution under reduced pressure and the residual material is dissolved in about 250 cc. of hot absolute alcohol. The alcoholic solution is treated with Norit (an activated charcoal product), filtered, and the filtrate evaporated to dryness under reduced pressure. The residual material is again extracted with about 100 cc. of absolute alcohol (dried over anhydrous calcium sulfate), under which conditions most of the ammonium chloride formed during the ammonolysis reaction remains undissolved. The alcoholic extract is filtered and the filtrate is cooled to approximately 0–5° C. and maintained at this temperature for a period of about one hour. The crystalline material which separates is recovered by filtration to produce approximately 5.5 gms. of α-amino-β,β-diethoxy-propionic acid which contains a trace of halogen. This product can be recrystallized if desired, employing about 30 cc. of 80% aqueous ethanol to produce substantially pure α-amino-β,β-diethoxy-propionic acid; dec. p. 170–200° C. (depending on rate of heating). Anal. calc'd. for $C_7H_{15}O_4N$: C, 47.44; H, 8.53; N, 7.91. Found: C, 47.65; H, 8.83; N, 8.13. Equiv. weight; Calc'd: 177.2. Found: 175.

Modifications may be made in carrying out the present invention without departing from the spirit and scope thereof and the invention is to be limited only by the appended claims.

I claim:

1. The process of preparing α-amino-β,β-diethoxy-propionic acid which comprises reacting ethyl α-chloro-β,β-diethoxy-propionate with an aqueous alkaline solution at a temperature below about 50° C., and reacting the compound thus obtained with concentrated aqueous ammonium hydroxide, said reaction being carried out by heating the reactants together under pressure at a temperature of approximately 100° C.

2. The process of preparing α-amino-β,β-diethoxy-propionic acid, in substantially pure form, which comprises reacting ethyl α-chloro-β,β-diethoxy-propionate with aqueous sodium hydroxide solution at a temperature below about 50° C., reacting the compound thus obtained with concentrated aqueous ammonium hydroxide, said reaction being carried out by heating the reactants together under pressure at a temperature of approximately 100° C. for a period of at least about 15 hours to produce crude α-amino-β,β-diethoxy-propionic acid, separating this compound from the by-product ammonium chloride by evaporating the aqueous reaction mixture and extracting the residue with alcohol and filtering, decolorizing the alcoholic solution by treatment with activated charcoal, and cooling the alcoholic solution to crystallize α-amino-β,β-diethoxy propionic acid.

3. The process of preparing α-amino-β,β-diethoxy-propionic acid, which comprises reacting α-chloro-β,β-diethoxy-propionic acid with concentrated aqueous ammonium hydroxide, said reaction being carried out by heating the reactants together under pressure at a temperature of approximately 100° C.

4. The process of preparing α-amino-β,β-diethoxy-propionic acid, in substantially pure form, which comprises reacting α-chloro-β,β-diethoxy-propionic acid, at a temperature of approximately 100° C. under pressure, and for a period of at least about 15 hours, with concentrated aqueous ammonium hydroxide to produce α-amino-β,β-diethoxy-propionic acid; separating this compound from by-product ammonium chloride by evaporating the aqueous reaction mixture and extracting the residue with alcohol and filtering; decolorizing the alcoholic solution by treatment with activated charcoal, and cooling the alcoholic solution to crystallize α-amino-β,β-diethoxy-propionic acid.

5. α-Amino-β,β-diethoxy-propionic acid.

OSCAR H. JOHNSON.

REFERENCES CITED

The following references are of record in the file of this patent:

UNITED STATES PATENTS

| Number | Name | Date |
| --- | --- | --- |
| 2,405,820 | Faith | Aug. 13, 1946 |

OTHER REFERENCES

Wohl et al. "Ber. Deut. Chem.," vol. 40 (1907), pages 93–95.

Wislicenus "Ber. Deut. Chem.," vol. 43 (1910), page 3530.

Oroshnik et al. "J. Am. Chem. Soc.," vol. 67, May 1945, pages 722–723.

Sugasawa "Chem. Zent," vol. 98, (1927-II), page 1814.

Block "Chemical Review," vol 38, June 1946, page 514.

British Report 40 (CPS—69) May 30, 1944, page 1 (Sept. 27, 1945).

Upjohn Report V, April 13, 1944, pages 24–26 (Sept. 27, 1945).

Merck Report 10, Jan. 31, 1944, page 10 (Sept. 27, 1945).

Merck Report 12d, Feb. 18, 1944, page 5 (Sept. 27, 1945).

Merck Report 17, April 17, 1944, page 2 (Sept. 27, 1945).

Squibb Report 8, Jan. 1944, page 7 (Sept. 27, 1945).

(Each of the above reports is available in Div. 59.)